United States Patent
Ivey et al.

(10) Patent No.: US 12,260,412 B2
(45) Date of Patent: *Mar. 25, 2025

(54) SYSTEMS AND METHODS FOR DYNAMICALLY DETECTING AND PREVENTING CONSUMER FRAUD

(71) Applicant: Blackhawk Network, Inc., Pleasanton, CA (US)

(72) Inventors: Henry Ivey, Pleasanton, CA (US); Rajiv Venkataramana Appana, Fremont, CA (US); Patrick Ramsey, Pleasanton, CA (US); Theodore Yeh, Pleasanton, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,976

(22) Filed: Dec. 11, 2023

(65) Prior Publication Data

US 2024/0104575 A1 Mar. 28, 2024

Related U.S. Application Data

(63) Continuation of application No. 17/549,451, filed on Dec. 13, 2021, now Pat. No. 11,887,125, which is a continuation of application No. 14/789,710, filed on Jul. 1, 2015, now Pat. No. 11,232,452.

(60) Provisional application No. 62/019,975, filed on Jul. 2, 2014.

(51) Int. Cl.
*G06Q 20/00* (2012.01)
*G06Q 20/40* (2012.01)
*G09C 1/00* (2006.01)

(52) U.S. Cl.
CPC ....... *G06Q 20/4016* (2013.01); *G06Q 20/409* (2013.01); *G09C 1/00* (2013.01)

(58) Field of Classification Search
CPC ..... G06Q 20/4016; G06Q 20/409; G09C 1/00
See application file for complete search history.

(56) References Cited

U.S. PATENT DOCUMENTS

| | | |
|---|---|---|
| 8,020,763 B1 | 9/2011 | Kowalchyk et al. |
| 2005/0278192 A1 | 12/2005 | Cantini et al. |
| 2006/0123098 A1 | 6/2006 | Asher et al. |
| 2007/0129999 A1 | 6/2007 | Zhou et al. |

(Continued)

*Primary Examiner* — Dante Ravetti
(74) *Attorney, Agent, or Firm* — Barnes & Thornburg LLP; Jerry C. Harris, Jr.

(57) ABSTRACT

Systems and methods discussed herein relate to a system for detecting and preventing fraudulent transactions through collecting requests for website access, stored-card trades and sales, and transactions using physical or electronically issued credit, debit, stored-value, and other cards. The fraud detection system not only flags individual transactions, but is also configured to dynamically track and update banned/ watch lists associated with request artifacts and cards in order to catch and prevent individual actors as well as BOTs, at least by adjusting the thresholds used to evaluate risk scores and what is placed on the banned/watch lists based upon requests received as well as information from financial institutions, merchants, government agencies, and watchdog groups. The system is also configured to provide information to those groups.

17 Claims, 3 Drawing Sheets

(56) References Cited

U.S. PATENT DOCUMENTS

2010/0161468 A1* 6/2010 Hickman .............. G06F 21/445
                                                    705/35
2012/0330819 A1   12/2012  Weinflash et al.
2013/0018795 A1    1/2013  Kolhatkar et al.
2014/0122331 A1    5/2014  Vaish et al.
2014/0310159 A1   10/2014  Zoldi et al.

* cited by examiner

SYSTEMS AND METHODS FOR DYNAMICALLY DETECTING AND PREVENTING CONSUMER FRAUD

CROSS-REFERENCE TO RELATED APPLICATIONS

This application claims priority to and is a continuation of U.S. application Ser. No. 17/549,451, filed Dec. 13, 2021, which claims priority to and is a continuation of U.S. application Ser. No. 14/789,710, filed on Jul. 1, 2015, entitled "Systems and Methods for Dynamically Detecting and Preventing Consumer Fraud", which claims priority to U.S. Provisional Patent Application No. 62/019,975, "Fraud IQ," filed Jul. 2, 2014; each of the above applications are each incorporated herein by reference in their entireties.

FIELD OF THE INVENTION

The disclosure generally relates to the display of electronic stored-value cards in electronic transactions.

BACKGROUND

Companies have a vested interest in protecting their systems and bottom line from fraud, whether that fraud stems from online or in-store purchases and across a wide range of purchase methods from the use of cash, to checks, to debit, credit, and stored-value cards. As such, some companies perform a fraud check prior to selling and/or shipping goods to customers and may decline authorization if a customer or a means of purchase is called into question as being fraudulent on its face or as being used by an unauthorized party.

SUMMARY

In an embodiment, a system for detecting fraud, comprising: a non-transitory memory; a processor; and at least one application stored in the memory and executable by the processor, wherein the application is in communication with a data store, wherein the application: receives a request to at least one of view a website and engage in a transaction using a stored-value card, wherein the request is associated with an artifact, wherein the artifact comprises at least one of a profile, a key, a fingerprint, and a digital fingerprint; determines if the artifact is approved to use the stored-value card based upon at least one of: an analysis of the risk score associated with the request and a risk threshold, a determination as to whether the first party is on a banned artifacts list based upon the received artifact, wherein the determination if the artifact is on the banned artifact list, and a determination as to whether the artifact is associated with the stored-value card; based upon the determination whether the artifact is approved to use the stored-value card, at least one of: process, based upon a determination that the first party is not on the banned access list and is approved to use the stored-value card when the risk score is below the risk threshold, the request, and provide, to the first party, based on a determination that at least one of the first party is on the banned access list and that the first party is not approved to use the stored-value card when the risk score is at or above the risk threshold, an appearance of processing the request; and update the profile associated with the first party based upon the request and the determination as to whether the first party is approved to use the stored-value card, wherein updating the profile comprises updating the risk score.

In an embodiment, a method of detecting fraud, comprising: receiving, by an application stored in a non-transitory memory and executable by a processor, a request from a requesting party to at least one of view a merchant website and engage in a transaction using a stored-value card, wherein the non-transitory memory is in communication with at least one data store, wherein a plurality of profiles are stored on the at least one data store; determining, based upon an analysis of a profile of the plurality of profiles if the requesting party on a banned access list; based upon a determination that the requesting party is not on the banned access list, processing the request, wherein processing the request comprising at least one allowing website view and engaging in the requested transaction, and at least one of presenting the first party with at least one benefit of the plurality of benefits, wherein the plurality of benefits comprises: providing a discount, providing a reward, accepting a previously provided reward, providing loyalty options, providing fast pay, accepting ACH transfer, value exchange, money transfer, spend value, providing or enabling access to an e-wallet, providing access to purchase high risk products, providing express access to sites and services with reduced security checks, and upgrading services accessible by the first party, wherein upgrading services comprises at least one of decreasing shipping time, decreasing request processing time, raising a shopping limit associated with the first party, raising a shopping limit associated with the stored-value card; and at least one of updating the banned access list and updating the profile based upon the request.

In an embodiment, a system for detecting fraud, comprising: a non-transitory memory; a processor; and at least one application executable by the processor, wherein the at least one application is in communication with a data store, wherein the at least one application: receives a request to use a stored-value card, wherein the request is associated with at least one artifact; determines whether the at least one artifact is on a banned artifacts list, determines, in response to a determination that at least one of the at least one artifact is on a banned artifacts list or that a risk score associated with the at least one artifact is at or above a risk threshold, that request is not associated with the stored-value card; in response to the determination, at least one of disables the stored-value card; reverses a transaction made with stored-value card; holds a value associated with the stored-value card; provides an appearance of a processed transaction with the stored-value card; and decreases accessibility or options at the site; and updates at least one of a profile associated with the artifact and the banned artifacts list based upon the request and the determination that the artifact is not associated with the stored-value card.

LISTING OF FIGURES

DISCUSSION OF DISCLOSED EMBODIMENTS

Figure 1:
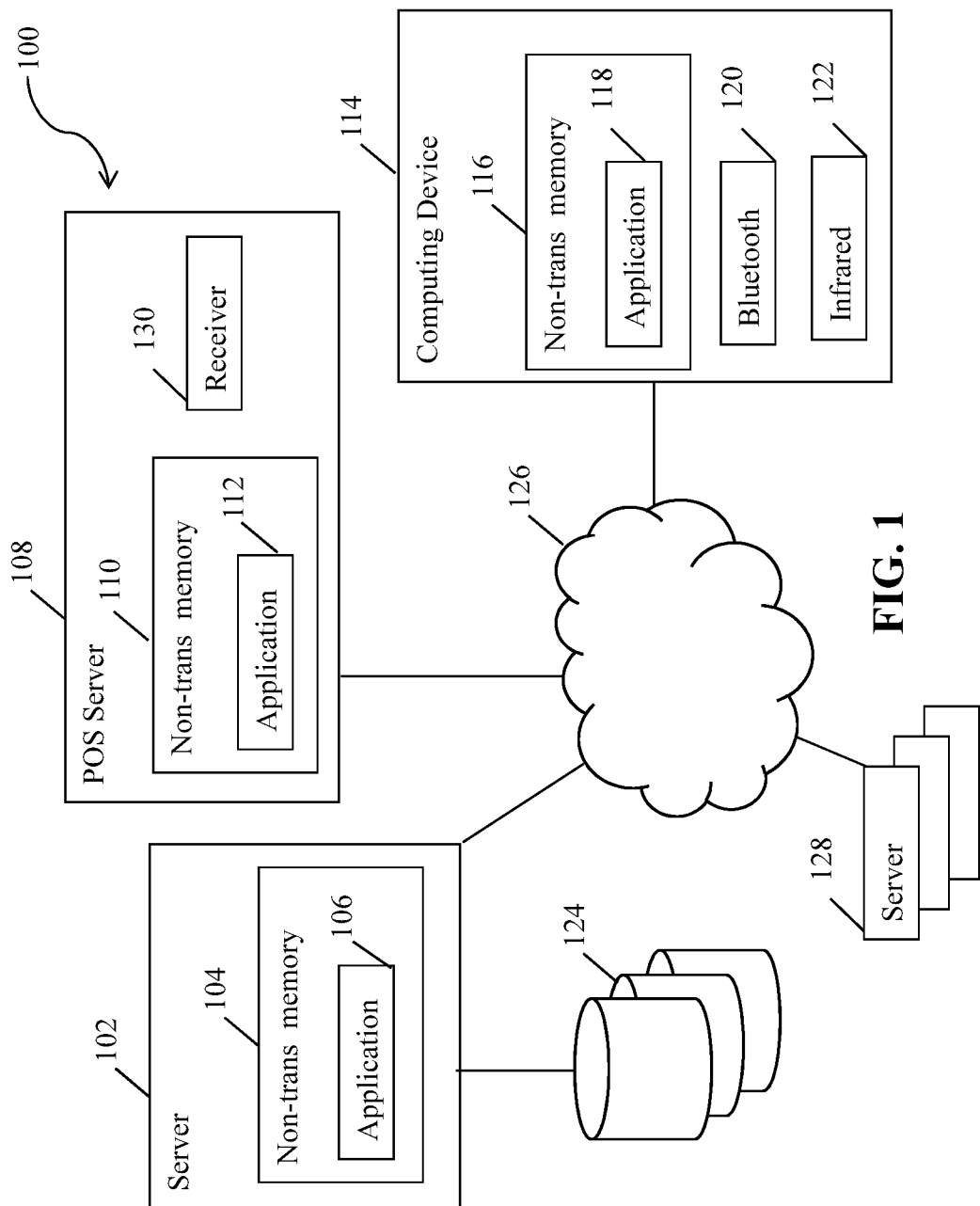
FIG. 1 is an illustration of a system for detecting fraud.

Systems and methods discussed herein may be directed towards a means of determining if a party requesting a transaction, for example, using a debit, credit, stored-value, or combination card thereof is an authorized user of the card, or if they are an unauthorized user, either because the card is fake or because the user is not authorized to be in possession of and/or use the card (the unauthorized users may be collectively referred to herein as "BOTs"). The authorized users may be rewarded for use with various gifts and/or e-gifts, discussed below, and the unauthorized user as well as the card may be flagged. The determination as to whether or not a user making a request to use a card is an authorized user or a BOT may be based upon a log-in, which may include a fingerprint or other biometric data. As discussed herein, flagging a card or an artifact, including a profile, key, digital fingerprint, or biometric fingerprint or other artifact that may be used as an identifier, may be defined as creating an association between that item and a suspicious list or indication, e.g., a "yellow light" that there is the potential for fraud but a threshold has not been met or exceeded, or that a lower threshold (as compared to one that, if exceeded, would result in being put on the banned artifact/access or banned card lists). Being on the suspicious list may cause additional security checks or enhanced monitoring to be performed, which may occur with or without the awareness of a user, device, or institution associated with the card. In one example, the fraud detection application may alert an institution associated with the card that it has been flagged, and the institution may provide the same information to the application regarding suspicious, banned, or approved (cleared) cards.

In various embodiments, a plurality of means of obtaining and using cards, including stored-value, credit, and debit cards, may be employed, to which the systems and methods for fraud detection described herein are applied in order to track "good," "bad," and suspicious actors and cards. In one embodiment, a reloadable card product line may comprise information stored in a vault or a safe. That is, there is an e-vault or an e-safe that may be accessible on a partition of a user's device or through a web gateway to a POS/merchant, third party, or other server. These cards may be associated to create anonymous profiles because the server does not associate the card or any information acquired/received with the use or attempted use of the card, e.g., biometrics (fingerprints) or activity histories (digital fingerprints) or any PINs (keys) with an actual user identity, physical address, email address, name, etc. In this embodiment, there is no background check performed prior to, during, or subsequent to the use of these cards, but rather a profile is generated based upon that use and analyzed to flag suspicious transactions, put cards on a banned list, take cards off of a banned list, or combinations thereof. In an alternate embodiment, a first party may purchase a real or virtual card such as a stored-value card, or may authorize a second party to use a different type of card (credit/debit). In this example, the credit card used to purchase the item, and/or the location (physical or virtual or both) where the item was purchased may be associated with the card, thereby also creating a profile, the creation of which may be invisible to and unknown by the first and/or the second parties. In an embodiment, the credit or debit card, or other method of purchase, may be tied to the stored-value card in either an anonymous or identify-profile embodiment. Once either a stored-value card (or series of cards identifiable by a range of unique identifiers and/or other card information) has been flagged as suspicious/fraudulent/stolen, and/or when a payment device such as the credit or debit card has been flagged, requests may be denied and handled as discussed herein. This request handling may include presenting a dummy site to the requestor, reporting to the financial institution or merchant associated with the payment device (e.g., if a store credit card was used) about the fraudulent attempt and associated card number(s), and recording in the system's own database including adding the stored-value card information to the banned card list.

Fraud detection in consumer transactions is increasingly a concern given the use of digital transactions using credit, debit, stored-value, and other payment devices where parties are not face-to-face for identification purposes. These digital interactions can create the opening for internet bots, which are applications specifically designed for various purposes such as the fraudulent acquisition and use of others' personal information and/or payment devices including falsified payment devices and information, and may be referred to herein as "BOTs." Consumer fraud may also be a concern due to the use of payment devices that are not inherently linked to a financial institution, enterprise, or individual party, because payment devices may be employed by BOTs. As discussed herein, the BOTs may be configured to steal card information from cards issued by enterprises and/or financial institutions and steal and/or match that card information to identity information. BOTs may also be configured to attempt purchases using cloned or forged/falsified payment devices. These purchases may initially be small, to see if the transactions are completed successfully, and then slowly ramp up or dramatically ramp up in amount and scope. For example, a BOT or plurality of BOTs may attempt to use payment devices to purchase small items online, and once those transactions are approved, the purchase requests may ramp up to expensive electronics and/or accessories.

In an embodiment, BOTs may be detected because of their operation. BOTs may be configured, for example, to auto-populate forms and perform other functions that mimic human actions and interactions with point-of-sale interfaces and terminals, and the speed of this field population may be tracked in order to flag BOTs. In order to prevent fraud, including BOT fraud, the behavior and environment of various requests are analyzed and tracked to determine which artifacts and/or payment devices are "good" (e.g., approved for purchase based on artifacts and/or the associated card) or are "bad" (e.g., fraudulent BOTs, people, or cards), and to dynamically track and update the banned lists that reflect these classifications of "good" and "bad' as well as the thresholds used to determine the classifications.

By using the systems and methods discussed herein for fraud detection, patterns of behavior associated with one or both of a plurality of artifacts and a plurality of payment devices can be stored and analyzed in order to develop and maintain "bad-actor" or "banned" lists that flags actors and payment devices being used in fraudulent transactions. In an embodiment, this information is gathered from requests and other sources such as watch lists and data from merchants, financial institutions and government agencies. The received information is stored, and analyzed in order to adjust system thresholds and adjust the above-discussed banned lists based upon a plurality of requests received by an application or applications as discussed herein. These requests may comprise requests to view websites, requests to view portions of websites, requests for purchases, requests for returns, requests to exchange and/or sell stored-value cards, and requests to access a benefit. A benefit may comprise a variety of opportunities as discussed herein, including rewards for future or current redemption, access to certain areas of the website (e.g., sales, trunk shows, previews), expedited order processing and/or shipping, or reduced/absent security checks. The requests may be associated with some of a plurality of artifacts and, in some cases, with at least one card. While stored-value cards are discussed herein, the requests may comprise, additionally or in the alternative to a stored-value card, a bank routing number, a credit card, a debit card, and/or digital (electronic) currency.

As used herein, the term "artifact" may be used to refer to associated with a key, a fingerprint, and/or a digital fingerprint received in a request for website access and/or a transaction. The key, fingerprint, and digital fingerprint may be associated with and/or comprise a plurality of behavioral information and a plurality of environmental information, the plurality of environmental information may comprise a location of requests, a font, origin information of the request, a history of updates at the origin, a version cycle, or combinations thereof. The history of the updates may comprise OS updates, flash updates, add-on updates, or other system updates that may have occurred on the originating device, network, or other host. This history may also detect and/or analyze what, if any, proxy servers or routings are associated with the request, for example, if a request is found to have been routed through three countries, this may cause the associated risk score discussed herein to increase.

In an embodiment, the location of the requests may comprise at least one of an IP address, a latitude, a longitude, a country, a state, a town, a municipality, a county, a region, a GPS position, or combinations thereof. The browser interface data may comprise an operating system type, an operating system version, antivirus software, malware, plugins, or combinations thereof. In some embodiments, the profile may be comprise one or more of a fingerprint or other biometric indicator, a key, and a digital fingerprint and may be referred to as an "anonymous" profile because the fingerprint, key, and digital fingerprint are not associated with a person's name or social security number or other identifying information. The term "profile" or may be used herein to collectively refer to both anonymous profiles and identity profiles. In some embodiments, the anonymous profile may be one where no background check is performed, that is, where no identification confirmation is performed and it may be established unbeknownst to the user or with the user's permission but without action by the user other than by making a request (including using biometric devices) and, in some embodiments, approving the storing of their request information. If the request information comprises identifying information, in some embodiments, this information may be parsed or otherwise not stored in the system to preserve anonymity. In an embodiment, a plurality of filters and rules may be applied by the system discussed herein in order to comply with state, local, federal, or other privacy laws.

In alternate embodiments, the profile may not be anonymous and may be described as an "identity profile," and may further comprise a login, a party's name, a password, an email address, secondary contact information, a street address, a plurality of previous requests, previous transactions, credit, debit, and stored-value cards associated with the pluralities of previous requests and previous transactions, a plurality of previous dummy transactions, a plurality of stored-value cards associated with the previous dummy transactions, and a plurality of stored-value cards associated with the profile (which may overlap those used in previous transactions/requests/dummy transactions) and approved for use by the profile (e.g., based on the artifacts associated with the profile) based on that association.

A "dummy transaction" as discussed herein is the term used to describe a scenario in which the fraud detection system presents a plurality of fields to a requestor (including a BOT) and gathers information from what is entered, how it is entered, and does not take any action such as shipping a product or completing a sale based upon that information.

For example, if the application determines that a request originates from at least one artifact on the banned artifacts list (which may be referred to as a "banned access list" since requests associated with artifacts on the list may be banned from website or server access/transactions or partially banned from access, including being presented with the dummy website discussed herein) and/or is associated with a card on the banned cards list. It may also occur when an artifact or card has been flagged as suspicious but may not have been banned yet. In this scenario, after the fraud detection system makes its detection, one of several actions may occur is that the system may present the actor with a dummy website in order to collect a plurality of information. This plurality of information collected is associated with a profile or an anonymous profile depending upon the request and the information submitted, and may comprise a login, a password, a card number, a security code, a QR code or barcode, a biometric, or combinations thereof, and no goods or services are actually ordered or shipped based upon the received information but it appears to the user (which may be a BOT) that the requested transaction were being processed as a normal transaction would be processed. This information is collected and stored by the system and the profile/anonymous profile is updated. In some embodiments, the collected information may trigger updates to at least one of the banned artifacts list, banned cards list, and related thresholds used to determine what goes on to those lists.

A profile and/or an anonymous profile may be associated with a risk score, which may be based upon the artifacts associated with a profile. That is, a risk score may be determined dynamically (e.g., as requests associated with the profile are received) by the fraud detection application or may be determined periodically and stored. In some embodiments, a risk score may be associated with a fingerprint, digital fingerprint, and/or a key, that is, with an anonymous profile. This score may be based upon the artifacts associated with the profile as well as other factors including a velocity associated with the profile, the velocity is discussed in detail below. When a request for web site access/viewing or a transaction is received by the fraud detection application, the application determines if there is a profile (anonymous or otherwise) associated with the request, determines if a card is associated with the request, determines if the profile comprises artifacts on the banned artifacts list, determines if the card is on the banned card list, determines if the card is associated with the profile, and determines if the risk score is above a predetermined threshold. The predetermined threshold may be determined by financial institutions, by the fraud detection application, or by third parties, and may vary depending upon the type of purchase, type of request, and type of card associated with the request. The threshold may be adjusted on a dynamic, real-time basis in response to information received from requests or from third parties, and may have weighted factors depending upon the current retail environment, for example, if country X is known for being a country where fraudulent transactions tend to originate, risk scores associated with profiles and cards that are associated with country X (or requests that originate there) may be higher than those from country Y.

In an embodiment, the request may not comprise or be associated with any card. In this embodiment, the request may be for access to preview sales, discount pages, trunk shows, contests, or other areas of a website that may require pre-approval to enter, such pre-approval which may be predicated on the assessment of a fraud risk associated with an artifact associated with the request/requestor—e.g., either artifacts associated with the (known) party, with the request origin (which could involve an unknown actor even though it's an identifiable location), or combinations thereof.

In an embodiment, an application receives a request to make a transaction using a stored-value card. The application may retrieve information about a plurality of artifacts associated with the request, these artifacts may be retrieved based upon a profile, anonymous or otherwise, and in some embodiments, the application may receive, from a computing device including mobile devices or from a point-of-sale terminal, an identifier such as a key, digital fingerprint, or fingerprint that may or may not be associated with a profile. The application may analyze a risk score associated with the profile, in addition to or instead of an analysis of the key, fingerprint, or digital fingerprint, to determine if the risk score is above a predetermined threshold and/or to determine if the artifacts (key, fingerprint, digital fingerprint) are on a banned artifacts list. The banned artifacts list may comprise a plurality of fingerprints, digital fingerprints, profiles, profile information (including names, emails, and anything other trackable data in the profile) that have been flagged either by the fraud detection system or by government and watchdog agencies or merchants, this information may be retrieved from those agencies and stored for analysis and use in the fraud detection system, and updated dynamically. The risk score may be impacted, for example, if the profile is associated with (or the request itself it associated with) a high-risk origin, for example, if country X is has a history of a high percentage or other measurement of fraudulent transaction requests, the risk score of the profile may be higher than if the profile is associated with country Y which does not have such a history.

In an embodiment, if the application determines that the risk score exceeds the threshold, the request may be denied, and this denial may be by a notification to the requestor, for example, directly to the computing device used to make the request or through the POS sever that may have transmitted the request as discussed below. In other embodiments, the denial is not presented to the requestor, which may be a BOT or other bad actor. Instead, actions discussed in detail below may be initiated by the application, including presenting the requestor (or requesting device, directly or by way of the POS server) a dummy website that would collect information from the requestor and store that information into the profile associated with the artifact/profile associated with the requestor. In one example, if the application determines that an abnormal number of requests are send from city X (or from a particular application, digital currency application, financial institution), contrary to what may have been previously established as a threshold or normal pattern of requests from that area, the location of the request, which is associated with the request and/or the artifact associated with the request, the request may be flagged as being from a BOT/bad actor. The application may then adjust a threshold associated with the request origin (geographic location or region) in order to reflect this increase in potentially fraudulent requests. In an embodiment, the request origin that exhibits abnormal behavior as discussed above may be flagged by flagging artifacts associated with the request origin, these artifacts may be placed on the banned artifacts list or banned access list, or may be otherwise flag to indicate that the artifacts may be associated with suspicious behavior, but not to a level (threshold) that would cause the artifacts to be placed on the banned list(s).

In an embodiment, when that the risk score is under the threshold and that the artifact(s) are not on the banned artifact list, the application may allow processing of the request, for example, viewing of a web page, allowing a purchase, or other transaction request such as switching one stored-value card for another. In some embodiments, additional benefits as discussed below may also be presented to what may be referred to as a "good" actor.

In an embodiment, the application may also evaluate the stored-value card associated with the request. This evaluation may be in response to or based upon a determination by the application that the risk score is under the threshold and that the artifact(s) are not on the banned artifact list, the application. If a profile is associated with the request, the application may determine if the stored-value card is associated with the profile. If it is, then the request may be processed as discussed herein, and if it is not, the request may be denied as discussed herein, and a profile, if any, that the stored-value card is associated with, as determined by a list from the data stores discussed herein, the profile may be flagged or a notification may be sent to a contact associated with the profile that an attempted use of the card occurred. In an embodiment, a financial institution or other issuer of the card may also be alerted as to its attempted fraudulent use.

In an embodiment, the application may receive, from the POS server or from an application on the requestor's device, a plurality of information associated with the stored-value card. This information may include a brand name, a unique numeric/alpha/alphanumeric/symbol or combination identifier, a category, a sub-category, a load value, a bonus value, an expiration date for some or all of the total value (load+bonus+incentives) of the card, a use history, and a plurality of other stored-value cards that it may be switched/swapped for. The application may compare this information to the banned card list, and/or confirm other elements of the request, for example, that a card of brand X may be swapped for a card of brand Y, and process or deny the request as discussed herein based upon the determination as to whether the card is on the banned list and/or is being used outside a plurality of use parameters established for the card. These use parameters may not only comprise what the card may be swapped for, but also a range of dates for use, a category of purchase, a sub-category of purchase, or a brand of the purchase (e.g., if an umbrella company SuperSports allows use of its' Jim's Javelins and Nick's Kicks cards interchangeably to purchase fitness products and apparel), or combinations thereof.

In either case, that is, regardless of whether a transaction is processed or denied, and independent of how the transaction is processed or denied, the profile (anonymous or otherwise) associated with the request, as well as the banned artifacts list and banned cards list may be updated as appropriate. In some embodiments, as discussed herein, the threshold used for the risk score determination may be updated. This may be, for example, to adjust the threshold for the location of the request to make the system more sensitive to flagging transactions originating from Paris, or those using a particular card/brand/category combination or a card prefix/suffix (for example, the risk score would be weighted more heavily if a card with a prefix of 3435 was presented because there had been a rash of flagged transaction requests with cards containing this prefix and/or a particular card/brand/category combination. The thresholds may also be adjusted based upon information received from the plurality of remote servers as discussed herein, which may be associated with government agencies and watchdog groups that are directed towards or tasked with identifying and preventing consumer fraud.

FIG. 1 illustrates a system 100 comprising a fraud detection server 102, a point-of-sale (POS) server 108, a computing device 114 and a plurality of servers 128 that may be configured to engage in communications with each other by way of a network 126, which may comprise wireless and/or wired access and may in some embodiments may be a cloud computing system as discussed herein. In some embodiments, some of all of the fraud detection server 102, the POS sever 108, the computing device, 114 and the plurality of servers 124 may be in communication by way of public WiFi, Bluetooth, infrared, or other near-field communication mechanisms. The fraud detection server 102 may comprise a non-transitory memory 104 and an application 106, which may be referred to as the fraud detection application 106, and may be in communication with a plurality of data stores 124. The application 106 may comprise a plurality of modules which may also be referred to as tools, each of which may be configured to communicate with at least one of the POS sever 108, the computing device, and the plurality of servers. The POS server 108 may comprise a kiosk or other remote device configured to receive requests including requests for website views, website access, product selection, product purchase, and product return. The POS server 108 may comprise a receiver 130 that may comprise a Bluetooth, NFC, infrared, biometric, or other receiver configured to receive an at least one requestor identification input and an at least one card identification. The POT server 108 may further comprise non-transitory memory 110 where a POS application 112 may be stored. In an embodiment, the plurality of data stores 124 may comprise a plurality of card profiles, a plurality of profiles, a plurality of artifacts (which may be associated with some or all of the profiles), a banned artifacts list, and a banned cards list.

In an embodiment, the computing device 114 may comprise a kiosk, a personal computer, a laptop computer, a portable digital assistant (PDA), a mobile phone, a smartphone or other media-enabled phone, a tablet, or combinations thereof. Depending upon the type of personal computing device 114 employed in the system 100, it may comprise an at least one non-transitory memory 116 which may be partitioned into a plurality of partitions which may be accessible by some or all of the user/owner of the device, a telecommunications service provider, a financial institution, a third party vendor, or combinations thereof. The memory 116 may comprise an at least one application 118, which may be referred to as the requesting application 118, employed in the system 100 and may further comprise other applications (not pictured) involved in various functionalities of the device such as email, texting, short message service (SMS), or other applications that may be downloaded to or otherwise accessible by the device 114 when it is in communication with the network 126 and/or by Bluetooth 120, infrared 122, or other near-field communication methods. In an embodiment, the plurality of servers 128 may be owned by, used by, or otherwise associated with financial institutions, law enforcement agencies, private groups including fraud watchdog groups, private or publicly owned corporations, or combinations thereof.

In an embodiment, a security API employed in the system 100, which may exist, for example, between the POS server 108 and the fraud detection server 102, and/or between other actors, may be further employed to enable a pre-check or a pre-qualification. In this embodiment, when a request is received by the application 106, an "approved" list that may comprise artifacts, card information, or combinations and associations thereof, may also be employed. Requests received that comprise at least one artifact and/or card on the approved list(s) may be expedited and receive additional benefits in comparison with requests that are allowed because the requesting party/artifact/card are not on the banned list. That is, the pre-qualified information may enable the application 106 to more readily allow transactions by using information received from the plurality of servers 128 that may contain this pre-qualification information. This may enable the owners/operators of some or all of those servers to offer incentives to consumers. In a related embodiment, the POS server 108 may contain similar application in its memory 110, and may communicate this information along with requests received from the computing device 114 in order to further expedite transactions and provide benefits to pre-qualified consumers, who may have paid a premium or exhibited a history or particular level of patronage, for example, over a predetermined time period, within a predetermined spending range, or exceeding a predetermined frequency level, in order to receive this service.

In an alternate embodiment, at least some of the plurality of remote servers 128 may be associated with private organizations such as consumer fraud watchdog groups and other organizations that may pay to be in communication with the fraud detection server 102 (just as the POS server 108 may have access predicated on a one-time payment or by a contractual agreement associated with one or more payments). These private organizations may receive a discount and/or an "elite" designation by sharing information in their respective data stores that may identify bad actors, cards, and artifacts discussed herein. It is appreciated that these private organizations may also be national or international financial institutions.

In an embodiment, the computing device 114 may send a request to the POS server 108. The request may be sent from the computing device 114, for example, by way of the requesting application 118 over the network 126, or using the Bluetooth 120 or the infrared 122 mechanisms, to view a website or engage in a transaction. The request may be received by the POS application 112 which may be in communication with the fraud detection application 106. The fraud detection application 106 may determine if the request (1) originates from a known artifact, (2) originates from a banned artifact, (3) is associated with a card, including a stored value, single use, refillable, credit, or debit card, and (4) if the associated card is banned, based on the information in the received request and the information in the data stores 124. If the fraud detection application 106 determines that the request originates from a known artifact that is not on the banned artifacts list, and/or if the requesting artifact is authorized to use the card associated with the request if there is a card associated with the request, the fraud detection application 106 may process the request. In an embodiment, processing the request may comprise allowing the requestor to access the website, allowing the requestor access to sale items, preview sales, or other consumer advantages, or may involve allowing the requestor to complete at least one purchase from the website after access is granted. In addition, processing the request may comprise providing the requestor with at least one of a plurality of advantages, for example, the fraud detection application 106 may, or may cause the POS application 112 or the requesting application 118 to: present the first party with at least one functional benefit, upgrade services, a discount, a reward, at least one loyalty option, a fast pay option, an ACH transfer, a value exchange, a money transfer, a spend value, provide or enable access to an e-wallet, provide access to purchase high risk products, or combinations thereof, wherein the plurality of functional benefits comprises at least express access to sites, access to services with reduced security checks, and disabling Captcha, wherein the upgraded services comprise decreased shipping time, decreased processing time, increased shopping limit. Express access may comprise click-access, e.g., access to a website or part of a website that is not predicated on entering additional information or passing security checks that are visible to the user as well as those checks that are not visible to the user. In some embodiments, this express access may be further based on a token, signature, and/or a cookie associated with an artifact or a card during previous transactions requests.

In an embodiment, when the fraud detection application 106 determines that the request originates from an artifact that is on the banned artifacts list, and/or that the requesting artifact is not authorized to use the card associated with the request if there is a card associated with the request, the fraud detection application 106 may decline to process the request. However, this decline may not be obvious to the BOT or requesting party because, in some embodiments, the fraud detection application 106 provides an appearance of processing the request by way of a dummy website. This enables the application 106 to at least one of initiate or complete a transaction associated with the request in an alternate environment in order to collect a plurality of information about the BOT or other actor. That is, in the dummy transaction, it is merely the appearance of a request completion/processing and no goods or services are actually ordered or shipped, rather, the application 106 receives a plurality of information after initiating the dummy transaction, this plurality of information may comprise a login, a password, a shipping address, an email address, a stored-value card number, a security code, a QR code, a barcode, a biometric, combinations thereof, and other information as appropriate for the requested transaction. The application 106 may update the data store 124 and/or the application 112 with the outcome of the determination of whether or not the request is processed, and with the plurality of the information received during the dummy transaction. This information may be employed to update the thresholds discussed herein as well as the risk score associated with the profile as well as the banned card list and banned artifacts list, as discussed below with respect to FIGS. 2 and 3.

In alternate embodiments, after the determination that the request originates from an artifact that is on the banned artifacts list, and/or that the requesting artifact is not authorized to use the card associated with the request if there is a card associated with the request, and instead of or in addition to the appearance of processing the request, the application 106 may take other actions including at least one of disabling the stored-value card, reversing a transaction made with the stored-value card (e.g., recent previous transactions), placing a value associated with the stored-value card on hold, and/or decreasing one of accessibility to or options for use of the website, by at least one of enabling Captcha, increasing shipping time, increasing a transaction processing time, lowering a shopping limit associated with the profile or the stored-value card, and removing high-risk products from availability for purchase by the requestor/BOT.

In another example, the application may determine that the artifact and/or the associated card are not on banned lists, but that one or both may be on a "suspicious" or a "watch" list. In that event, limited access, for example, to less costly items available on the website, may be available for purchase, and the activity associated with the request may be tracked and processed as discussed herein. Examples of scenarios that may land an artifact or an associated card on a suspicious/watch list may be a pattern of use, including the physical and electronic locations of use, purchase types, and purchase amounts, as well as shipping addresses and/or any user-identifying information submitted during purchase, denied requests for transactions, and a pattern of re-loading. Other scenarios may comprise an aggregate value of spending over time (e.g., does it exceed a threshold?), and a comparison of an artifact against the card associated with the request, that is, does the email address of previous uses of the card correspond to the request to use (or trade/sell) the card in this request? The email address associated with the request may be evaluated to determine how recently it was created and/or if it was created as a part of a bulk email address generation and/or if it has been previously associated with suspicious or fraudulent requests.

Figure 2:
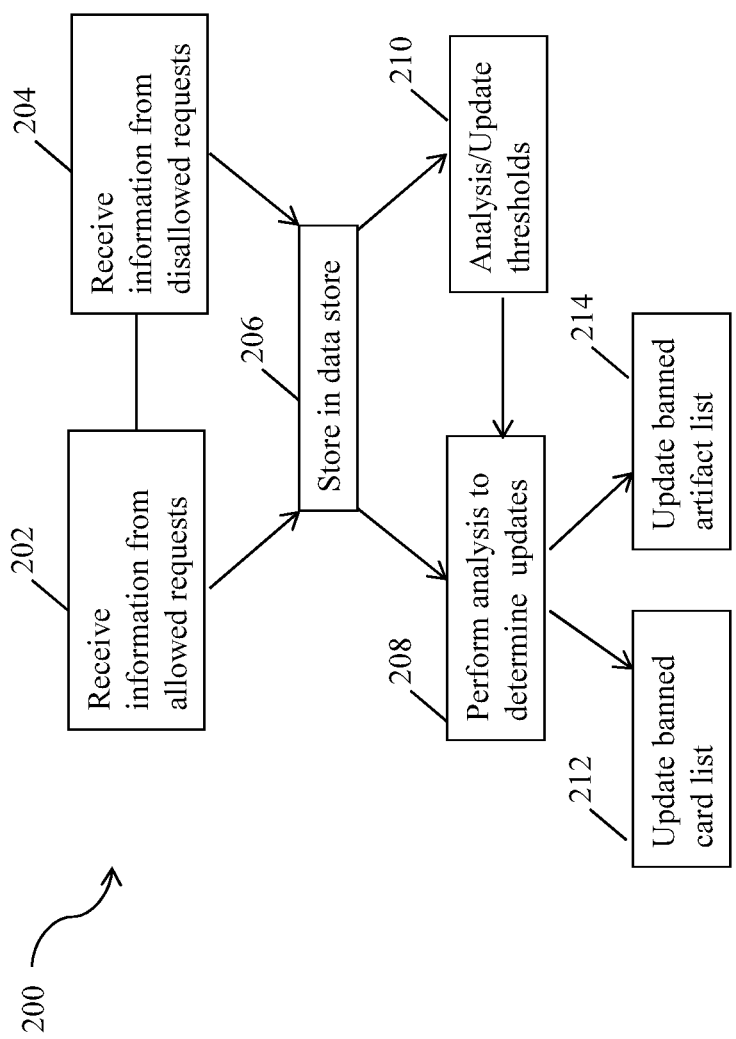
FIG. 2 is a flow chart of a method of detecting fraud including generating and dynamically maintaining a fraud detection system.

FIG. 2 illustrates the method 200 of generating and dynamically maintaining a fraud detection system. At block 202, a plurality of information is received regarding requests that have been allowed by, for example, a fraud detection system such as the system 100 in FIG. 1. These allowed requests are discussed in more detail in FIG. 3. At block 204, a plurality of information is received regarding requests that were disallowed as discussed in detail in FIG. 3. At block 206, the information received at blocks 202 and 204 is stored in a data store, for example, the data store 124 of FIG. 1. The stored information may be used to update thresholds at block 210, these may be thresholds for elements of a profile such as thresholds for a risk score, velocity, or other use pattern. As used herein, the "velocity" may be the rate of transactions per a time window (e.g., a predetermined period of time) in light of an at least one additional variable. In an embodiment, the at least one additional variable may comprise a card value (load value, stored value, bonus value), a location of purchase, a stored fingerprint associated with a profile, a product type purchased, a behavioral variable (an email address extension, an IP address, a zip code, a proxy, a financial institution associated with the card, a card type such as credit, debit, or stored-value), a referral address (e.g., from a proxy server to the POS server 108 or the fraud detection server 102), and other environmental variables including a language of a BOT signature. The velocity may be described as a dynamic, "living" characteristic or measurement that is adjusted in real-time not only based upon the making and success of transaction requests that are tracked and analyzed by the application 106, but also with information received from the plurality of remote servers 128 from government agencies, state and local law enforcement, as well as watchdog agencies and merchants/vendors who keep information about suspicious and fraudulent transactions. In addition, attributes such as the speed at which forms are filled out online, and/or the accuracy of the information in the forms (e.g., alphanumeric fields where only numbers are populated by a BOT) may be flags for fraud.

Figure 3:
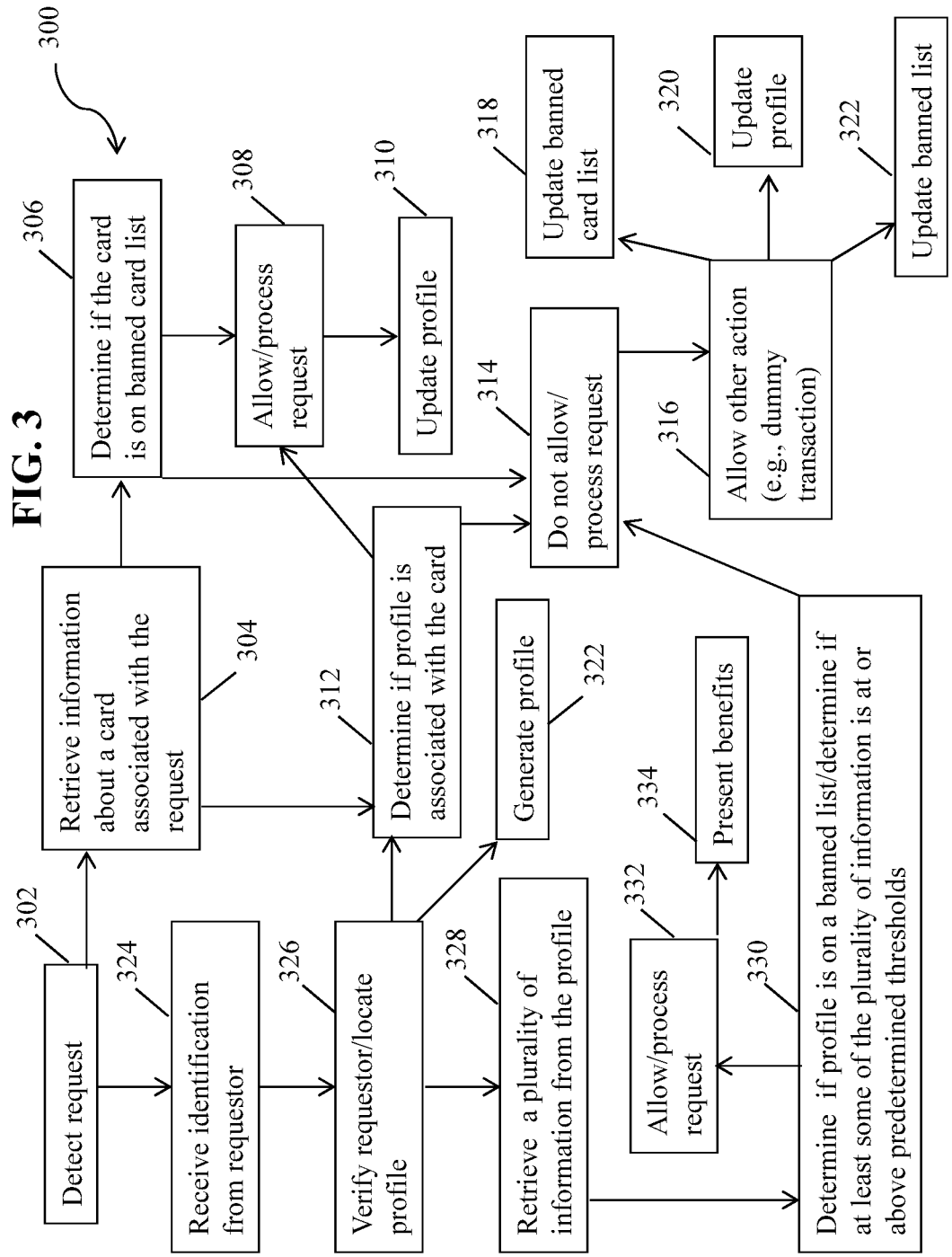
FIG. 3 is a flow chart of a method of dynamically tracking real-time transaction request to detect fraud.

At block 208, analysis may be performed to determine updates to the banned identification list at block 214 and/or the banded card list at block 212. In some embodiments, the analysis at block 208 as to which updates to the banned card list and banned identification list may be based upon the update of at least one threshold at block 210, since, in some embodiments, the thresholds may be employed to determine when to add to or remove information from the banned lists. The "banned identification list" may comprise a plurality of profiles and/or identifications such as keys, digital fingerprints, fingerprints or other biometrics. FIGS. 2 and 3 are discussed below.

In an embodiment, at block 210, a plurality of thresholds associated with the received information may be updated based upon the information received, the analysis at block 210 may also cause the application to perform an additional analysis 208 of the stored information to determine if updates are needed to the banned lists. At block 212, if a determination is made at block 208 that the banned card list is to be updated, the banned card list is updated with at least some identifying information associated with the card associated with the various disallowed requests, this information may not only identify the card itself but may also comprise information about the attempted card use as well as previous allowed and allowed requests (if any) associated with the card, including artifacts and artifacts common the allowed and disallowed requests (if any). At block 214, if a determination is made at block 208 that the banned artifact list is to be updated, the banned artifact list is updated. Updating the banned lists may comprise adding to, removing from, or modifying information on those lists.

FIG. 3 is a flow chart of a method 300 of dynamically tracking real-time transaction request to detect fraud. At block 302 in the method 300, an application such as the fraud detection application 106 in FIG. 1 may receive a request. This request may comprise a request to view or access a website or part of a website, or may be a request for a transaction that may be associated with a card, including a credit card, debit card, or stored-value card. At block 304, if a card is associated with the request, a plurality of information associated with the card is received by the application so that it may determine at block 306 if the card is on the banned card list. The banned card list may be determined not only by the system and methods discussed herein, but also by a plurality of information received from a plurality of remote servers such as the servers 128 in FIG. 1. When a determination is made at block 306 that the card is on the banned list, the application declines at block 314 to allow/process the request and may allow other actions at block 316 that are described in detail below, which may also result in the banned card list being updated at block 318, the profile (if any) associated with the card to be updated at block 320, and the banned artifacts list to be updated at block 322, which also may depend on the plurality of information received at block 304.

When a determination is made at block 306 that the card is not on the banned list, the application may, at block 308, allow/process the request and update a profile associated with the card at block 310 when the information received at block 304 indicates that there is a profile associated with the card. For example, processing the request may comprise allowing the requestor to access the website, allowing the requestor access to sale items, preview sales, or other consumer advantages, or may involve allowing the requestor to complete at least one purchase from the website after access is granted. In addition, processing the request may comprise providing the requestor with at least one of a plurality of advantages, a functional benefit, upgraded services, a discount, a reward, at least one loyalty option, a fast pay option, an ACH transfer, a value exchange, a money transfer, a spend value, provide or enable access to an e-wallet, provide access to purchase high risk products, or combinations thereof. In an embodiment, the plurality of functional benefits comprises at least express access to sites, access to services with reduced security checks, and disabling Captcha, and the upgraded services may comprise decreased shipping time, decreased processing time, and an increased shopping limit.

In some embodiments, at block 312, the application may determine not only if profile information is received, but also if the profile is associated with the card. If the profile is not associated with the card, as determined by the application, the method may proceed to block 314. The profile may be (or not be) associated with the card based upon various artifacts, including an association with the payment device used to purchase the stored-value card. As discussed herein, the payment device may be associated with the stored-value card in an anonymous profile, where non-identifying information (e.g., a payment device identifier and a stored-value card identifier) is associated with a unique identifier and/or other information associated with the stored-value card, but associated with a name/address/social security number or other person- or entity-specific information A notification (not pictured) may be sent to an email address or other contact associated with a profile that is associated with the card, if it is determined at block 312 that the card is associated with a profile but not the profile associated with the request. The notification may additionally or alternatively be sent to some or all of the plurality of remote servers 128 so that the groups and/or government agencies, and merchants associated with or otherwise receiving information from these servers can be alerted of the potential fraud. If the application determines that the profile is associated with the card, the method may proceed to block 308.

In an embodiment, at block 324, a plurality of information may be received by the application from the requestor, this plurality of information may be referred to as a plurality of artifacts, and at block 326, and the application determines if a profile is associated with the received artifacts (e.g., profile information, a key, a fingerprint, a digital fingerprint). If no profile is found, for example, in the data store 124 in FIG. 1, a profile may be generated at block 322, stored in the data store 124, and associated with the plurality of information/artifacts at block 324. At block 312, similarly to what is discussed above, the application may determine not only if profile information is received, but also if the profile is associated with the card. If the profile is not associated with the card, as determined by the application, the method may proceed to block 314. If the application determines that the profile is associated with the card, the method may proceed to block 308. In an embodiment, at block 328, the plurality of artifacts associated with the profile (including cases where there is an anonymous profile) are retrieved and a determination is made at block 330 as to whether the artifacts are on a banned list and/or if a risk score or other artifact associated with the request (e.g., the profile), is above a predetermined threshold.

When a determination is made at block 330 that (1) the profile/artifacts associated with the profile are on the banned artifacts list, and/or (2) the risk score is above the predetermined threshold, the application declines at block 314 to allow/process the request and may allow other actions at block 316. At block 316, the application may present an appearance of processing the request by way of a dummy website to the requestor/BOT, disable the stored-value card, reversing a transaction made with the stored-value card (e.g., recent previous transactions), place a value associated with the stored-value card on hold, and/or decrease one of accessibility to or options for use of the website, by at least one of enabling Captcha, increasing shipping time, increasing a transaction processing time, lowering a shopping limit associated with the profile or the stored-value card, and removing high-risk products from availability for purchase.

In an embodiment, providing an appearance of processing the request may be done by way of a dummy website. This enables the application to at least one of initiate or complete a transaction associated with the request in an alternate environment in order to collect a plurality of information about the BOT or other actor. That is, the dummy websites merely provides the appearance of a request completion/processing and no goods or services are actually ordered or shipped, rather, the application receives a plurality of information after initiating the dummy transaction, this plurality of information may comprise a login, a password, a shipping address, an email address, a stored-value card number, a security code, a QR code, a barcode, a biometric, combinations thereof, and other information as appropriate for the requested transaction. The banned card list may be updated at block 318, the profile may be updated at block 320 (including the artifacts and risk score, which may be referred to as an artifact in some embodiments), and the banned artifacts list may also be updated.

In an embodiment where the request is to sell a card such as a stored-value card, or trade a brand X stored-value card for brand Y, a plurality of scenarios may occur. A party attempting to divest (which includes trading and selling) their stored-value card may do so on a vendor's website that handles the transaction, or in-person at a third party vendor, or at a kiosk or through a web portal on a computing device including a portable communication device. In an embodiment, a stored-value card is purchased through a plurality of ways and means, and may be purchased virtually (e.g., the buyer doesn't receive a physical card) or with the buyer receiving an actual card, fob, or other device capable of storing at least one value. When the buyer requests to divest the card, an application such as the application discussed above may underwrite (validate) (1) the subject card(s), (2) the requestor, and (3) the transaction, or combinations of (1), (2), and (3).

In an embodiment, the request received comprises at least one card, and the application determines, based upon information associated with the card which may be pulled from the card or entered by a user including the card owner or a store employee or other third party assisting in the transaction, for example, a unique card identifier, a PIN, a balance, a load value, any associated incentives/value boosts, an activation date, an activation time, attempts at previous transactions, and results (approved/denied) of attempts at previous transactions. The application may analyze the time between card activation and the request and may retrieve information from a data store that may be accessible only by the application or that may be a shared or third party database to determine if the card has been associated with a previous request to divest. If the application determines that the card is associated with a previous request to divest that was either granted or determined to be fraudulent, the request to divest may be denied. As discussed above, the application may also determine whether the card's information (artifacts) is associated with a banned card list, which may be dynamically updated as discussed herein.

In an embodiment, the party associated with the request may also be verified as a good actor/party authorized to divest the card. Since the request may be made in person or virtually, the verification may result in allowing the request, denying the request, or allowing the request but flagging either the card or the user (by way of an artifact associated with the user) and continuing to monitor their requests and results of those requests. The party may be verified based on artifacts discussed herein including a check against a banned artifacts list, a transaction request history, the results of previously requested transactions, the types of cards associated with previous requests, where diversity in brand/categories may not be flagged the same way that requests to divest the same brand of card repeatedly may be flagged. In some embodiments, driver's license or other government-issued identification may be requested or otherwise employed in this verification of the actor.

In some embodiments, the application may request information regarding pending transactions associated with the card that may reduce the card's stored value subsequent to when the request to divest the card is made. In some embodiments, even if a request is approved, the reselling of the card is stayed for a predetermined period of time, for example, 5 days, in order to ensure that the load value is stable, since a reduction in load value subsequent to the request being approved may indicate that the card has been compromised. The application may also determine anonymous information about the requesting party, that is, information associated with the location of the request itself. Requests made from foreign locations (e.g., outside of the United States and its territories) may be automatically denied, and requests associated with a location that falls outside a perimeter associated with a location associated with previous requests by that party may also be flagged or cause the request to be denied.

In an embodiment, the transaction itself may be underwritten (verified), in that information regarding the location, whether it is a kiosk, computing device, or retail location may be tracked, stored, and analyzed for trends. For example, if the third party locations of Scarf Bonanza, KT's Tees, and Lori's Lashes are used to make requests to divest cards, the frequency, amount, brand, category, and other factors (which may be combined to create a velocity as discussed herein) may be tracked to determine patterns. For example, if a particular Lori's Lashes location receives 2 requests to divest per week, and that number jumps to 20/week during a predetermined time period, this may flag that location and a notification may be sent to a system administrator or related application. Similarly, if the average value for all KT's Tees requests to divest ranges from $30-$50 over a predetermined period of time, and that number increases to $80-$100, this may also cause the vendor and/or particular vendor locations to be flagged. A plurality of artifacts and information are involved in this analysis, and it may be said that the application is looking for outliers, but the application, in conjunction with remote servers and applications, may more so be performing analyses to look for a combination of outliers and mid-hers, to detect creep in the numbers before a large jump (e.g., fraud) is detected. A mid-lier may be defined as a point that would not be considered a statistical outlier but that may indicate, especially in combination with other data points, a shift or a creep that may signal fraudulent behavior if it continues. For example, if the average request to divest is from $30-$50, requests amounts that are greater than +/−4 standard deviations may be considered outliers, and request amounts that are between +/−2.5-3.0 standard deviations may be considered mid-hers and result in flagging. In other embodiments, different standard deviations or other parameters may be used to flag both fraudulent and suspicious behavior.

In some embodiments, if the request to divest is granted, the same card information is used for the card that was sold/traded in and is being re-sold. In alternate embodiments, new or additional information/identifiers may be assigned to the card when it is re-sold, and the previous identifying information may or may not be tied to this new information (mapped) in a data store such as data store 124.

In an embodiment, requests may not be either processed or declined, but requests may also be allowed or conditionally allowed, and the card, party, or transaction context may be flagged as suspicious (e.g., processing the request may be thought of as a green light, declining as a red light, and flagging as suspicious as a yellow light), unbeknownst to the party or the location of the transaction. In an embodiment, the velocity as discussed herein may also comprise a measurement of an aggregate value of transactions over time associated with a card, transaction context, or party, for example, a bulk seller. This time period may be a lifetime threshold or may be a predetermined period, for example, a maximum of $1000 in trade/sale requests may be made by a part within 6 months. Once this threshold is exceeded, additional identification information may be requested and verified before the bulk seller is approved to continue selling, at which point an additional threshold may be set. In some embodiments, the bulk seller receives a notification before the threshold is exceeded, alerting them to this additional verification so that they may submit information for pre-approval and not have their services interrupted (if verified with the additional information).

In one example, if an individual (not a bulk seller) is selling/trading stored-value cards directly (e.g., not at a third party vendor), the individual hits a threshold, which may also be defined as a velocity limit, the velocity being associated with and determined based on a plurality of artifacts and information, additional information may be needed before they can continue selling/trading. A velocity may exceed a threshold not only based upon the amount and/or dollar value of sales/trades over time, but also based upon the product (brand) mix, the category mix, the dollar value mix, the history of value changes after submission (if any), and a history of suspicious and/or fraudulent attempts at a sale/trade. Approval may be complete or conditional, and in the conditional case the party may be placed on a suspicious/watch list and have a lowered velocity threshold or additional security checks. In some embodiments, the party will not know if their approval is complete or conditional, as the additional security checks/verifications (e.g., location, card information, etc.) may be done in by the application in a manner that is not visible to the party.

If an individual is selling/trading through a third party, the velocity check may proceed in as similar manner as discussed above, but the third party, not only the individual, is analyzed to ensure that the location (virtual or retail) is not committing fraud in conjunction with or independently of its sellers/traders. In some embodiments, the POS server may collect and send information to the application in order to aid in this analysis.

The systems and methods discussed herein may in some embodiments be both channel and device-agnostic. That is, the application may be aware of the channel (in-store/retail, kiosk, web portal, mobile application) used for requests, as well as the device (PC, mobile, tablet, wearable technology), and may note and store this information, but may not restrict transactions based upon this information. In alternate embodiments, artifacts associated with channels and devices may have been flagged for suspicious or fraudulent behavior, and in those embodiments the channels and devices may be banned based upon those associated artifacts.

In an embodiment, a method of detecting fraud, comprising: receiving a request to view a merchant website from a website visitor, wherein the request comprises a request to use a stored-value card; determining a risk associated with the website visitor, wherein the risk associated with the website visitor is dynamically updated upon receipt of information concerning the website visitor and/or receipt of other request(s) to view the merchant website, wherein the other request(s) to view the merchant website are from the website visitor, a plurality of other website visitors, or both, wherein the risk associated with the website visitor comprises is a risk associated with use of the stored-value card by the website visitor. The embodiment further comprising: determining a velocity of the at least one request to view a merchant website; determining a velocity of the at least one request to use the stored-value card; running a detector program to determine whether the request to view the merchant website and/or the request to use the stored-value card is from a bad actor (e.g., one or more BOTs), a good actor, a new customer, a partner, or combinations thereof; creating or updating a profile, key, fingerprint, digital fingerprint, or combinations thereof, associated with the website visitor, wherein the profile, key, fingerprint, digital fingerprint, or combinations thereof comprises at least two components, wherein the at least two components comprises a behavior portion (e.g., a score associated with the behavioral information associated with the visitor), an environment portion (e.g., a score associated with the environmental information associated with the visitor), and optionally, a bank risk portion (e.g., a score obtained from one or more banks or creditors of the visitor and/or the stored-value card).

The embodiment further comprising: classifying the website visitor as a bad actor, a good actor, a new customer, a partner, or combinations thereof; harvesting behavioral information and environmental information associated with the website visitor; harvesting card information associated with the stored-value card, wherein the plurality of behavioral information comprises a plurality of previous requests, previous transactions, previous dummy transactions, and a plurality of stored-value cards associated with the first party, wherein the plurality of environmental information comprises, a location of the first party, a font, origin information of the request, a history of updates at the origin, a version cycle, or combinations thereof, wherein the location of the first party comprises at least one of an IP address, a latitude, a longitude, a country, a state, a town, a municipality, a county, a region, a GPS position, or combinations thereof, wherein the browser interface data comprises an operating system type, an operating system version, antivirus software, malware, plugins, or combinations thereof.

The embodiment further comprising associating the behavioral information, the environmental information, the card information, or combinations thereof, with the profile, key, fingerprint, digital fingerprint, or combinations thereof; cross-referencing the behavioral information, the environmental information, the card information, or combinations thereof with at least one list (e.g., a negative attributes list, a good attributes list, or both); updating the risk associated with website visitor; updating the at least one list with the information associated with the website visitor, or combinations thereof; and processing, or providing an appearance of processing, to the website visitor, a transaction at the merchant website according to the risk (e.g., a risk score), wherein updating the risk associated with the visitor comprises: calculating a risk score based on the at least two components.

The embodiment further comprising, in response to determining that the risk is above a risk threshold (e.g., a score having a numerical value, e.g., of 100, 200, 300, 400, 500, 600, 700, 800, 900, or less than/greater than, or expressed as a ratio, a range, a percentage variation, or combinations thereof), at least one of disabling the stored-value card; reversing a transaction made with the stored-value card; placing a value associated with the stored-value card on hold; providing an appearance of a processed transaction to the visitor; decreasing accessibility or options at the site (e.g., enable Captcha, increase shipping time, increase processing time, lower shopping limit, remove high risk products from availability for purchase, etc., or combinations thereof); or combinations thereof, wherein any of the method steps is performed by one or more processors executing at least one application, wherein the application is in communication with applications stored on other servers; profiling the website visitor as a good actor; allowing the good actor to process a transaction associated with the stored-value card; storing an anonymous profile for the good actor (e.g., in a data store); associating the anonymous profile with the good actor each time the good actor visits the merchant website; presenting the good actor with benefits (express access to sites and services with reduced security checks (e.g., disable Captcha), upgrade services (e.g., decrease shipping time, decrease processing time, raise shopping limit, etc., or combinations thereof), provide a discount, provide or accept a reward, provide loyalty options, provide fast pay, accept ACH transfer, value exchange, money transfer, spend value, provide or enable access to an e-wallet, provide access to purchase high risk products, or combinations thereof) based on the association of the anonymous profile with the good actor, wherein providing an appearance of processing a transaction comprises: allowing the bad actor to initiate and/or complete a dummy transaction in an alternate environment. wherein, during the dummy transaction, no goods or services are actually ordered or shipped, and the bad actor is allowed to enter a set of information (e.g., login, card number, security code, QR code or barcode, biometric, or combinations thereof) which is adequate to initiate and/or complete a real transaction (e.g., from the perspective of the bad actor).

In an embodiment, a computer program stored in a non-transitory memory for enabling a network server to signal fraudulent user activity to consumer website servers and point of sale servers and other remote servers, comprising software instructions executable by a processor for configured to network server to: analyze and/or catalog a sequence of webpage clickstream behaviors of a user computing device currently used to browse through a website maintained by a consumer website server; collect and maintain a data store of comprehensive dossiers of user device ID's obtained from many user-device visits to many webpages maintained by many websites over a period of time; match a user device currently visiting a website by identifying characteristics obtainable through a user device browser, and forwarding these over a network to a dossier file already maintained in the data store, if possible; calculate a fraud score in real-time based on results obtained in the steps of analyze and collect; and configure the calculation as a signal output useful to assist each consumer website server in determining whether to allow a proposed transaction to be concluded by a particular user computing device. The embodiment further comprising the application opening a new dossier file in response to in the data store to be used later to track activities of artifacts associated with the computing device and compare those artifacts (for example, from received responses) to any user device identification parameters then obtainable in response to a determination that data describing a particular user computing device cannot be matched by the network server to corresponding data stored in an existing dossier file in the data store, and the application determining the fraud score is determined based on the sequence of webpage clickstream behaviors.

The embodiment further comprising the application: embedding an endpoint client in a webpage presented on a website, and causing a browser in a user computing device to report back user device information (e.g., unique device identifiers, OS version, installed applications, application use patterns, e-wallet information (which may be walled off in whole or in part to provide access to anonymized information that is not associated with a name but rather with a pattern of use), capabilities, extensions, add-ons, configurations, and user device locations, and other data useful for a machine to sort through and contribute to corresponding user device dossier files maintained in the data store; centralizing the collecting and maintaining a data store of comprehensive dossiers of user device ID's obtained from many user-device visits to many webpages maintained by many websites over a period of time, wherein, a number of independent and unrelated websites are each programmed to forward user device activity reports to the network server for its sole control and maintenance of the data store; centralize the analyze a sequence of webpage clickstream behaviors of each user device then being employed to visit particular webpages, wherein, a number of independent and unrelated websites are each programmed to forward user device activity reports in real-time as they occur to a single centralized server for analyses of the webpage clickstream behaviors; centralize the generation of fraud scores in real-time based on results of the collection and analysis, and configure the results as a signal output which useful to assist each POS server/website, or financial institution server, in determining whether to allow a proposed transaction to be concluded by a particular user device, wherein, a plurality of websites which may be associated with related merchants or which may be independent and unrelated, or combinations thereof, are each associated with applications configured to forward user device activity reports in real-time as they occur to a single centralized server for its calculation and return of the fraud score, which may include the risk score of an artifact, card, transaction environment, or combinations thereof.

In an alternate embodiment, a computer program product stored in a non-transitory and executable by a process to build behavioral device identifications (ID) of user devices visiting websites monitored by a network server, comprising software instructions for enabling the network server to: extract a clickstream behavior related to the particular paths and order of webpages an individual user follows with a sequence of user clicks; identify distinctive users according to their past clickstream behaviors and user device configurations and attributes; record the clickstream behavior and comparing it to previously determined patterns of normal, suspicious, and fraudulent activity; track session activity and pattern-match the clickstream behavior to normal-suspect-abnormal-malware patterns; monitor and analyze online transactions according to pre-determined business rules and statistical models, and to update profiles of users and accounts; correlate alerts and activities; and search for relationships amongst users and channels, wherein, a consumer website can be warned with a signal over the network of high risk users in real-time.

In an embodiment, a network server configured to provide real-time fraud prevention, comprising a processor, a data store, and an application stored in a non-transitory memory of the server and executable by the processor to: build and store dossiers of user devices and behaviors from user-device configuration data and clickstream behavior descriptors collected from subscriber websites in real-time; distinguish individual user devices from others with the user-device configuration data; embed a client agent to compel user devices to transmit configuration data when a user visits respective webpages at independent websites; and organize a collection of comprehensive dossiers of user devices by their identifying information, and calculating a fraud score in real-time, wherein, each corresponding website is assisted with a signal in deciding whether to allow a proposed transaction to be concluded with the particular user and their device. The embodiment further comprising the application executing in a sandbox to access information about browser settings, plugins, JavaScript and Flash properties in discovering device attributes field-by-field. A "sandbox" may be an environment that isolates the execution of the application where the application can retrieve and analyze information from the requesting device without modifying that information, and in some embodiments, invisibly to the device itself. The application may be further configured to store profiles of user devices in device fields of a data store; compare possible matches from the data store to either find a matching device or create a new device record, and if an old device or device information was found, its fields are updated with the new data. The application may configure an end-point client to comprise a kernel of JavaScript, Flash Player video, and related technologies and to embed it in a webpage viewable by a user, wherein, the end-point client is configured to run in background and gather data for forwarding to a risk assessment server for determining a unique key and compare the unique key to a key data store to either find a matching key or create a new key record, wherein if a matching key is found, its fields are updated with the new data.

In an embodiment, a method for determining a high risk transaction event involving a transaction device at a merchant server (POS sever). In an embodiment, the method comprises receiving, by an application stored in a non-transitory memory on a fraud detection server and executable by a processor, a plurality of data associated with the transaction involving the transaction server; calculating a unique identifier instead of or in addition to a unique environmental key using the received data and the set of variables, wherein a transaction profile is associated with a set of transaction profile variables, wherein the calculated identifier is different than the key artifact discussed above. In this embodiment, the method further comprising: comparing the unique key to a data store of keys associated with user profiles; generating a transaction risk score using at least the unique key and the environmental key; and attaching a high risk flag to a user profile associated with the unique key if the score exceeds a threshold value, wherein the receiving, the comparing, the generating and the attaching are performed by at least one processor wherein the calculating is based on at least one of a recursive transaction function to characterize behavior indicative of a fraud risk and a pattern of successive low dollar purchases to characterize behavior indicative of a fraud risk, wherein the transaction device comprises a credit card, a debit card, or a smart phone configured to execute a transaction application.

In an alternate embodiment, a system for dynamically tracking and detecting fraud in transaction comprising: an application stored on a non-transitory storage medium and executable by a processor to: detect a transaction involving a user transaction device at a merchant, the merchant having a merchant profile, the merchant profile associated with a set of variables; receive data associated with a transaction involving the POS device; characterize a transaction profile based on a unique key, which may be associated with a profile, and an environment key, which may be associated with a transaction environment. In an embodiment, the transaction profile may comprise an artifact (which may be a profile), transaction environment (device and/or channel), and associated card, as well as other information that may be involved in a request for a transaction. The application may be further configured to calculate a risk score using the received data, the set of variables associated with the merchant, and the transaction profile; compare the risk score to a threshold value; and attach a risk flag to the transaction profile if the score exceeds the threshold value.

The embodiment further comprising the application setting a risk flag associated with a user profile wherein the risk flag is cross associated with the unique key and the environment key; executing a first scoring methodology wherein the product indicates that the transaction profile is high risk; disabling the transaction from being completed while allowing the transaction to continue; harvesting additional data from further transaction; and updating the unique key and environment key based on the additional transaction information; and associating the unique key with at least a second unique key based on associations with the environmental keys associated with the (first) unique key and the at least a second unique key, different from the first, wherein the updating comprising decrementing the risk associated with the unique key or environmental key after a predefined period of time or after a predefined number of transactions involving associated low risk transaction profiles associated with associated POS devices and incrementing the risk associated with the unique key or environmental key after a predefined period of time or after a predefined number of transactions involving associated high risk transaction profiles associated with associated POS devices and/or computing devices such as personal computers, laptops, mobile phone, smart devices, e-readers, tablets, personal digital assistance, kiosks and other portable electronic devices including wearable technology (watches, jewelry, cufflinks, shoes, glasses, apparel, etc.). The embodiment further comprising wherein the calculating uses a recursive transaction function to characterize behavior indicative of fraud risk, wherein the fraud risk is a pattern of successive low dollar purchases.

In an alternate embodiment, a system for detecting fraud risk comprising: involving a transaction initiated from a POS device, wherein the POS device is located at one of a website, web portal, public area, a third party vendor that is not associated with the transaction, and a merchant associated with the transaction, wherein the merchant associated with the transaction is associated with a merchant profile, the merchant profile associated with a set of variables, the system comprising: a server comprising a plurality of computer modules, which may be part of one or more applications, stored in a non-transitory memory of the server and executable by a processor; a first computer program module of the plurality of computer modules configured to receive data associated with a transaction from the POS device; a second computer program module of the plurality of computer modules configured to receive data associated with a user from the POS device; a third computer program module of the plurality of computer modules configured to that calculates a unique score using the received data and the set of variables; a fourth computer program module of the plurality of computer modules configured to compare the score to a threshold value; and a fifth computer program module of the plurality of program modules configured to attach a fraud risk score to the transaction, the fraud risk score indicating a likelihood that the transaction is a fraudulent transaction, wherein a determination is made by the system based on the merchant and the fraud risk score to take an action in response, wherein the computer modules comprise at least one processor.

In an alternate embodiment, a computer system for assisting businesses in detecting fraudulent activity, comprising: a non-transitory memory; and at least one processor coupled to the memory device, the at least one processor being configured to: derive a total risk score for each of a plurality of users of a business based on a plurality of risk scores, each of the plurality of risk scores being associated with a risk factor; and detect a user when the total risk score of the user differs from a reference value derived from the total risk scores of a plurality of users by a pre-determined margin, wherein the risk score is based upon an environmental ID associated with the activity and a user ID associated with the activity, wherein the risk factors comprise: an industry category, transaction type, geographical area; country of the address; product type; funds inflow, funds outflow, transactional pattern; number of transactions; amount of transactions; transactional volume; transactional frequency; transactional derivative; location of the transaction; time of the transaction; country of the transaction; and/or historical transactions.

In an embodiment, a method of detecting and tracking fraud, comprising: receiving, by an application stored in a non-transitory memory and executable by a processor, a plurality of information from a first transaction attempt, wherein the first transaction attempt comprises a request from a first customer is attempting to access a website, and wherein the non-transitory memory is associated with a plurality of data stores; determining, by the application, a risk assessment associated with the first customer based on a plurality of indicia of the individual associated with the first customer and a plurality of environmental information, wherein the plurality of indicia comprises a unique key, and wherein the plurality environmental information comprises a unique environment key; granting, by the application, in response to a determination that the first customer has a high risk of fraud, access to the website, wherein the access does not comprise the ability to complete any actual transaction has been disabled.

The embodiment further comprising: collecting, by the application, data from the behavior of the high risk customer; updating, by the application, the risk assessment for the customer based on the collected data; and adding, by the application, the customer to a high fraud risk data store of the plurality of data stores, wherein the unique transaction key comprises at least a unique key associated with the first customer and a unique key associated with the environment, wherein the environment is the environment from which the transaction request initiates, wherein the first customer is associated with at least a second customer in the data store based upon data associated with both the first customer and the second customer. The embodiment further comprising: creating, by the application, a profile is associated with the customer, wherein the profile contains a risk rating and transaction information, and storing, by the application, the profile in at least one of the plurality of data stores; obtaining, by the application, a bank risk score using transaction information, wherein the t risk assessment is further based on at least an individual risk assessment, a transaction personality and profile assessment, and a bank risk score; granting, by the application, access to a different website, wherein access is allowed to the (faux/dummy) different website designed to harvest additional transaction information from the customer.

The methods discussed herein may be executed on various systems and combinations of systems including via email, SMS, video, instant message, a website, an online storage medium, a cloud storage system, or combinations thereof. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider. The systems and methods discussed herein may employ cloud computing for some or all transactions, depending upon the embodiment.

EXAMPLES

Example 1: The fraud detection application receives multiple requests during a day from unknown actors, that is, from artifacts and/or cards that may not be associated with any banned or approved list. The application determines that an average 10 outlook.com email addresses are typically associated with requests during a predetermined period, for example, in a day. The unknown actors all are using outlook.com email addresses and the application, for example by way of a velocity engine, now detects 20 outlook.com addresses and compares this to a threshold. This may be an adjustable threshold, where a 200% increase is a viable trigger, so the outlook.com anomaly is detected and caught by the application. A related velocity check detects $200-$500 card volume thresholds, triggering behavioral score change. In an embodiment, a "honeypot BOT" may detect BOT signatures, correlating the signatures to artifacts associated with anonymous and identify profiles. A honeypot BOT may comprise a hidden form field on a website, associated with a "display: none" CSS rule, and the hidden form field is hidden from a real user's view. That is, it is a field that only a BOT could detect and fill out, so the application associates any entry in that hidden field as an indication that the requestor/actor is a BOT. In response to a determination that the requestor is a BOT, a risk score and/or volatility index may be raised dynamically and the application starts to reduce shopping card options and limits, and/or perform other actions associated with disallowed or flagged requests. Going forward, once a BOT is detected all other BOTs with the same artifacts or other associated profile within a 90% hit ratio, for example, during another predetermined time period, the application simultaneously shuts down (disallows request from) the other BOTs who are within this 90% hit ratio. In this example, a redemption functionality of the application may adjust/rescore parameters used for benefit offers and benefit redemption and may place a hold on funds associated with the request. This may be the case not only with stored-value cards, but also with credit and debit cards that are flagged in BOT/fraudulent requests.

Example 2: Bad Actors gaming the system. "Sleeper BOTs" impersonate good account behaviors. Buy 1 good card a month just like a good actor/authorized card user. The sleeper BOTs engage in this behavior for 6 months and then flip the behavior to buy $200 eGift cards in volume. For the first 6 months, the fraud detection application, for example by way of a profile engine, determines the Bad Actors are equivalent to an actor with good behavior. Over time the application raises (The Bad Actor BOTs) the actor's score allowing for shorter ship times and larger cart sizes. Subsequently, on a particular date/time or during a range of dates/times, a plurality of the BOTs attack and attempt to fraudulently purchase or use cards. Conventionally, a party/merchant would have to have inside knowledge of fraud detection and/or an immense amount of time and patience to map out the limits and triggers. Additionally, BOTs are expensive and having multiple BOTs only do 1-2 transactions a month wouldn't be cost effective. Finally, most BOTs have the same profile since the same Bad Actor created them. Thus, they look the same and garner attention. In this case the BOTs attack, the application, for example by way of the velocity engine discussed above, may catch a pattern such as a $$ amount/range or the same BOT configuration (language) or breaks the dynamic velocity. The velocity may be referred to as "dynamic" due to the measurement methods discussed herein and the real-time updating of velocities and related thresholds as discussed herein. If the use of a BOT is confirmed by the application, then a risk score or a component of the risk score such as the environmental score is set to zero and reset for all BOTs, locking out their shipping and funds/fund access. In an embodiment, a velocity check detects $100-$500 card volume thresholds have been exceeded, which may trigger a behavioral score change. The Honeypot BOT now adds all of the new BOT signatures detected based upon the velocity check (e.g., the BOTs associated with the exceeding of the threshold) to the correlation engine and the banned access list. Fingerprints now in the fraud detection system are updated. A volatility index raises as a risk score drops and dynamically starts to reduce shopping card options and limits. The volatility index may be defined as a risk index that may be dynamically updated based upon requests associated with, for example, the fingerprints which may be digital fingerprints, as well as information about the fingerprints, for example, from state drivers' license agencies and federal agencies including but not limited to law enforcement. In one example, after 3-4 hits from the BOTs all of the accounts associated with the BOTs should be detected and locked out, the accounts are frozen and reported to, for example, POS servers, remote servers for watchdog and government groups, as well as recorded and stored in the fraud detection system itself. Once a BOT is detected, all other BOT requests with the same fingerprint +90% hit ratio during a predetermined time period will be shut down (disallowed).

There has been described herein methods and dynamic systems for dynamic fraud detection and prevention. It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

The invention claimed is:

1. A system for detecting fraud, comprising:
a non-transitory memory;
a processor;
and at least one application stored in the memory and executable by the processor, wherein the application is in communication with a data store, wherein the application is executed by the processor and causes the processor to perform the steps of:
receiving a request to at least one of view a website;
receiving a request to engage in a transaction using a stored-value card,
wherein the request is associated with an artifact,
wherein the artifact comprises at least one of a profile, a key, a fingerprint, and a digital fingerprint; and
determining whether the artifact is approved to use the stored-value card based upon at least one of:
an analysis of a risk score associated with the request and a risk threshold, wherein the risk threshold is dynamically updated based on real-time system received data,
a determination as to whether the first party is on a banned access list based upon the received artifact,
and a determination as to whether the artifact is associated with the stored-value card;
determining whether the artifact is approved to use the stored-value card, the processor:
based on a determination that the artifact is approved to use the stored-value card, the processor, declining to process the request, based on a determination that at least one of (i) the first party is on the banned access list and (ii) the first party is not approved to use the stored-value card when the risk score is at or above the risk threshold, and instead performs an alternate environment transaction which appears to the first party as a processing of the request, wherein alternate environment comprises a dummy website.

2. The system of claim 1, wherein each profile is one of a plurality of profiles which comprise a plurality of behavioral information and a plurality of environmental information,
wherein the plurality of behavioral information comprises a plurality of previous requests, previous transactions, stored-value cards associated with the pluralities of previous requests and previous transactions, previous dummy transactions, stored-value cards associated with the previous dummy transactions, and a plurality of stored-value cards associated with the first party, wherein the plurality of stored-value cards associated with the first party are cards the first party is approved to use;
wherein the plurality of environmental information comprises: a location of the first party, a font, a plurality of origin information about the request, a history of updates at the origin, a version cycle, or combinations thereof, and
wherein the location of the first party comprises: an IP address, a latitude, a longitude, a country, a state, a town, a municipality, a county, a region, a GPS position, or combinations thereof.

3. The system of claim 1, wherein the key, the fingerprint, and the digital fingerprint each comprise at least two components of a plurality of components,
wherein the at least two components comprise a behavior component, an environment component, and a financial institution risk component,
wherein the behavior component comprises a score associated with behavioral information associated with the first party's profile,
wherein the environment component comprises a score associated with the environmental information associated with the first party's profile, and
wherein the financial institution risk component comprises a score obtained from one or more financial institutions based upon at least one of the first party's activity associated with the one or more financial institutions and the stored-value card.

4. The system of claim 1, wherein, in response to a determination that the risk score one of meets or exceeds the risk threshold or that the first party is on the banned access list, the application is further configured to cause the processor to at least one of:
disable the stored-value card;
reverse a transaction made with the stored-value card;
place a value associated with the stored-value card on hold;
decrease one of accessibility to, or options for use of, the website, by at least one of enabling Captcha, increasing shipping time, increasing a transaction processing time, lowering a shopping limit associated with the profile or the stored-value card, and removing high-risk products from availability for purchase, wherein the banned access list comprises a list of parties, wherein parties on the banned access list are prohibited from at least one of accessing the merchant website or using a payment device to engage in a transaction.

5. The system of claim 1, wherein the application is further configured to cause the processor to determine if the stored-value card is on a banned cards list stored in the data store and update the banned cards list in response to a determination that the first party is not approved to use the stored-value card or that the first party is on the banned access list.

6. The system of claim 1, wherein the application is further configured to:
generate a profile associated with the stored-value card; and
store the profile in the data store, wherein the profile comprises a plurality of information associated with the card, wherein the plurality of information comprises a brand, a category, a stored value, a face value, a QR code, a bar code, at least one approved user, an indication as to whether the stored-value card has been used or was attempted to be used in a flagged transaction, wherein the banned cards list comprises credit cards, debit cards, and stored-value cards used or attempted to be used in flagged transactions, and wherein the flagged transaction comprises a transaction identified as fraudulent by the application.

7. The system of claim 1, wherein, in response to a determination that the first party's risk score is below the risk threshold, the application is further configured to:
present the first party with at least one functional benefit, upgrade services, a discount, a reward, at least one loyalty option, a fast pay option, an ACH transfer, a value exchange, a money transfer, a spend value, provide or enable access to an e-wallet, provide access to purchase high risk products, or combinations thereof, wherein the plurality of functional benefits comprises at least express access to sites, access to services with reduced security checks, and disabling Captcha, wherein the upgraded services comprise decreased shipping time, decreased processing time, increased shopping limit.

8. The system of claim 1, wherein, to performing the alternate environment transaction comprises no goods or services actually ordered or shipped, and receiving, by the processor, a plurality of information from the first party, wherein the plurality of information comprises a login, a stored-value card number, a security code, a QR code, a barcode, a biometric, or combinations thereof.

9. A method of detecting fraud, comprising:
receiving, by an application stored in a non-transitory memory and executed by a processor, a request from a requesting party to at least one of view a merchant website and engage in a transaction using a stored-value card, wherein the request is associated with a risk score and a risk threshold, wherein the non-transitory memory is in communication with at least one data store, wherein a plurality of profiles are stored on the at least one data store, and wherein the request is associated with an artifact, wherein the artifact comprises at least one of a profile, a key, a fingerprint, and a digital fingerprint;
determining, by the application executed by the processor, that the requesting party is not approved for the transaction, wherein the determination is based on one of a profile of the plurality of profiles that is associated with the requesting party and a profile associated with the stored value card;
declining, by the application executed by the processor, to process the request and instead performing an alternate environment transaction which appears to the requesting party as a processing of the request, wherein alternate environment comprises a dummy website; and
updating, by the application executed by the processor, the profile associated with the requesting party based upon declining to process the request, wherein updating the profile comprises updating the risk score and wherein the risk threshold is dynamically updated based on real-time system received data.

10. The method of claim 9, wherein each profile of the plurality of profiles comprises a plurality of behavioral information and a plurality of environmental information,
wherein the plurality of behavioral information comprises a plurality of previous requests, previous transactions, previous dummy transactions, and a plurality of stored-value cards associated with the requesting party,
wherein the plurality of environmental information comprises, a location of the requesting party, a font, origin information of the request, a history of updates at the origin, a version cycle, or combinations thereof, and
wherein the location of the requesting party comprises at least one of an IP address, a latitude, a longitude, a country, a state, a town, a municipality, a county, a region, a GPS position, or combinations thereof.

11. The method of claim 9, wherein the profile, the key, the fingerprint, and the digital fingerprint each comprise at least two components of a plurality of components,
wherein the at least two components comprise a behavior component, an environment component, and a financial institution risk component,
wherein the behavior component comprises a score associated with the behavioral information associated with the first party's profile,
wherein the environment component comprises a score associated with the environmental information associated with the first party's profile, and
wherein the financial institution risk component comprises a score obtained from one or more financial institutions based upon at least one of the first party's activity associated with the one or more financial institutions and the stored-value card.

12. The method of claim 9, further comprising, in response to determining, by the application, that the requesting party is not approved for the transaction, at least one of:
- disabling the stored-value card;
- reversing a transaction made with the stored-value card;
- placing a value associated with the stored-value card on hold;
- decreasing one of accessibility to or options for use of the website, by at least one of enabling Captcha, increasing shipping time, increasing a transaction processing time, lowering a shopping limit associated with the profile or the stored-value card, and removing high-risk products from availability for purchase by the requesting party.

13. The method of claim 9, wherein performing the alternate environment transaction comprises:
- enabling the requesting party to at least one of initiate or complete a transaction associated with the request on the dummy website, wherein no goods or services are ordered or shipped, wherein the application receives a plurality of information from the requesting party, wherein the plurality of information comprises a login, a stored-value card number, a security code, a QR code, a barcode, a biometric, or combinations thereof.

14. A system for detecting fraud, comprising:
- a non-transitory memory;
- a processor;
- and at least one application executable by the processor, wherein the at least one application is in communication with a data store, wherein the at least one application is executed by the processor and causes the processor to:
  - receive a request to use a stored-value card from a requesting party, wherein the request is associated with at least one artifact of a plurality of artifacts;
  - determine the least one artifact of the plurality of artifacts is on a banned artifacts list,
  - determine that the request is not associated with the stored-value card;
  - in response to the determination that the request is not associated with the stored-value card, the at least one application executed by the processor causes the processor to decline to process the request, and instead perform an alternate environment transaction which appears to the requesting party as a processing of the request, wherein alternate environment comprises a dummy website; and
  - update a profile associated with the requesting party based upon declining to process the request, wherein updating the profile comprises updating the risk score.

15. The system of claim 14, wherein, updating the risk score comprises the application further configured to:
- update a risk score based on at least two components of a plurality of components associated with the stored-value card, wherein plurality of components comprises a behavior component comprising a score associated with the behavior of the use of the stored-value card, an environment component comprising a score associated with the environment the stored-value card was previously used in, a financial institution risk component, or combinations thereof.

16. The system of claim 14, wherein the profile comprises a plurality of behavioral information and a plurality of environmental information, wherein the plurality of environmental information comprises, a location of the requesting party, a font, origin information of the request, a history of updates at the origin, a version cycle, or combinations thereof, and
wherein the location of the requesting party comprises at least one of an IP address, a latitude, a longitude, a country, a state, a town, a municipality, a county, a region, a GPS position, or combinations thereof.

17. The system of claim 14, wherein declining to process the request further comprises at least one of:
- disabling the stored-value card;
- reversing a transaction made with stored-value card;
- holding a value associated with the stored-value card; and
- decreasing accessibility or options at a non-dummy website.

* * * * *